Feb. 7, 1950 R. FALCONE 2,496,526
SCAFFOLD OR TRESTLE HEADER
Filed Jan. 15, 1947 2 Sheets-Sheet 1
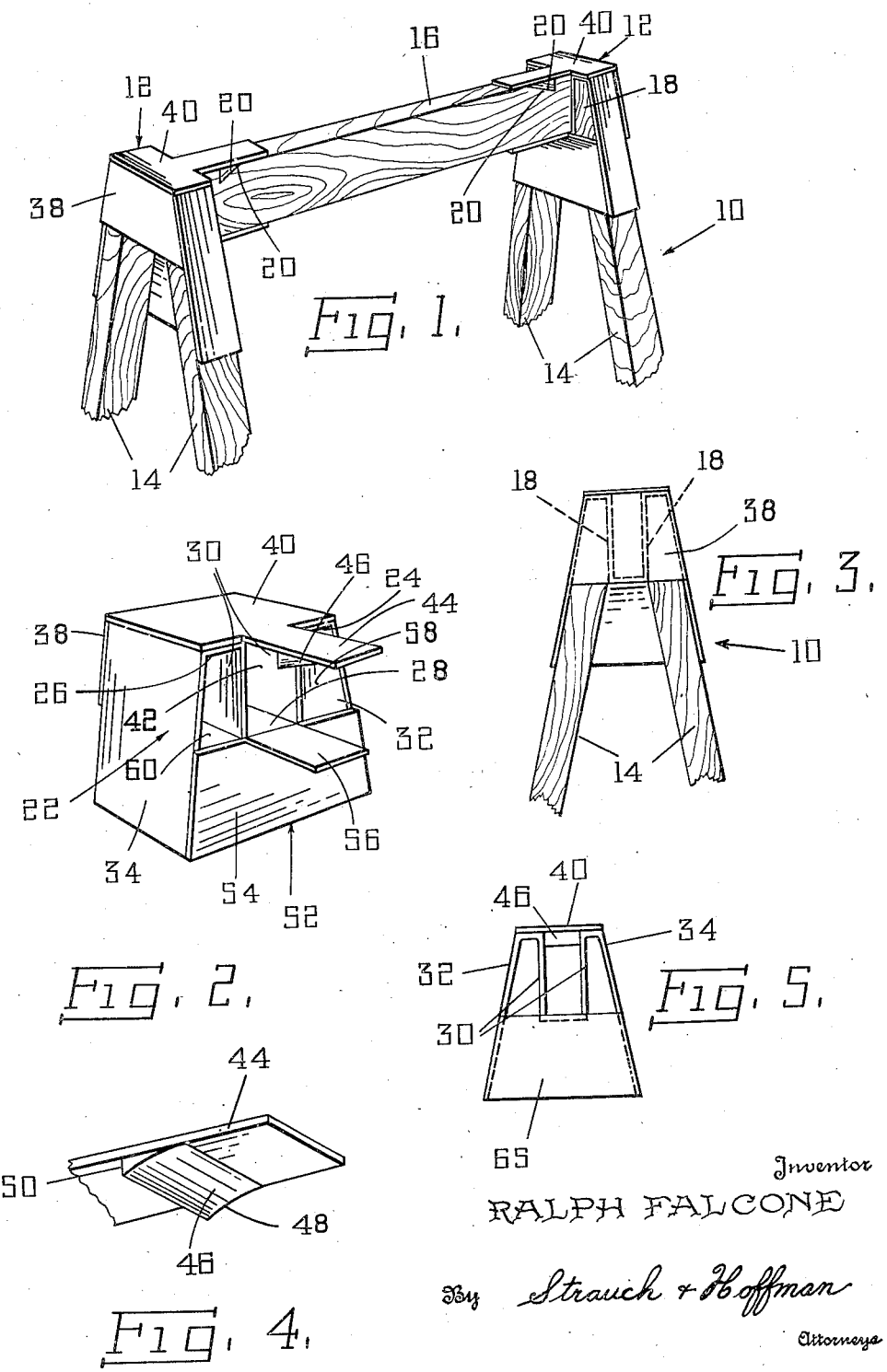
Inventor
RALPH FALCONE
By Strauch & Hoffman
Attorneys Feb. 7, 1950 R. FALCONE 2,496,526
SCAFFOLD OR TRESTLE HEADER
Filed Jan. 15, 1947 2 Sheets-Sheet 2
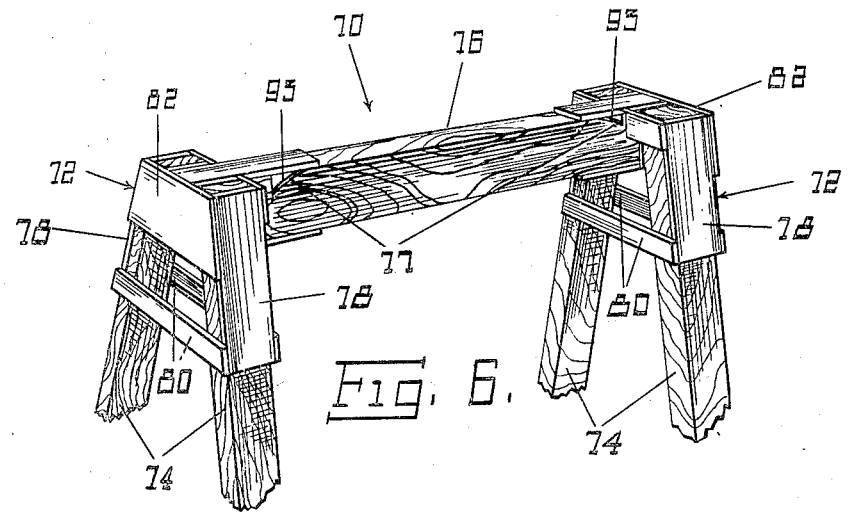
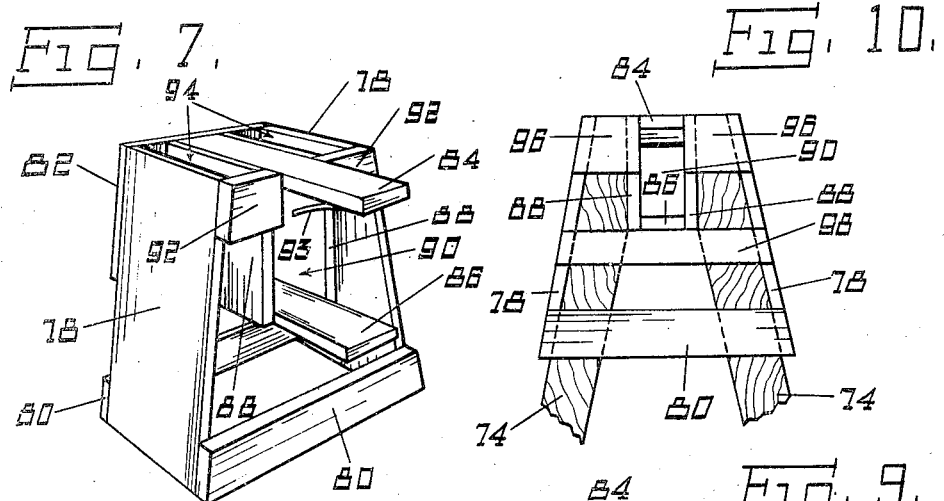
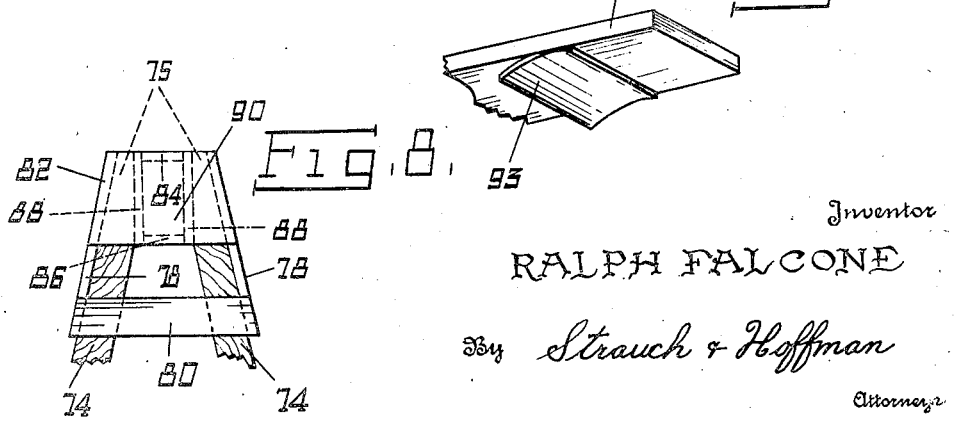
Inventor
RALPH FALCONE
By Strauch & Hoffman
Attorneys Patented Feb. 7, 1950

2,496,526

UNITED STATES PATENT OFFICE 2,496,526

SCAFFOLD OR TRESTLE HEADER

Ralph Falcone, Washington, D. C.

Application January 15, 1947, Serial No. 722,219

1 Claim. (Cl. 304—5)

This invention relates to trestle or "horse" coupler or header members used to secure the beam and legs together in their proper position.

While numerous devices of this nature, such as those of United States Patents 1,010,458 to Smith, 1,908,858 to O'Kane et al. and 2,271,701 to Maxwell, are known, none approach the simplest construction, efficiency or handling ease of the coupler of this invention.

It is the primary object of this invention to provide a unitary coupler structure into which the trestle legs and beam may be easily inserted and readily removed when desired.

Another object of this invention is to provide coupler members adapted to receive and lock the opposite ends of a beam in proper relationship to the trestle legs.

A further object of this invention is to provide a coupler member having outwardly extending flanges which engage the upper and lower surfaces of the trestle beam, the upper flange having a latch on the bottom surface thereof which engages a notch in the upper surface of the beam to lock the beam against axial movement.

A further object of this invention is to provide a trestle coupling of simple construction to allow ease of assembly, use, and manufacture.

A still further object of this invention resides in the provision of a coupler or header that may be readily and conveniently assembled with the legs and cross beam without the use of nails, screws, bolts or the like and with the minimum use of assembly tools.

Still another object of this invention is to provide a coupler member for a trestle assembly wherein the coupler is provided with tapered leg receiving pockets, open at both ends, to allow the tapered end of the legs to be forced therein until securely held in the pocket and, if the end of the leg extends through the pocket the excess may be removed.

Other objects will appear from the following description when read in connection with the appended claims and attached drawings wherein:

Figure 1 is a perspective view of one embodiment of the present invention showing its use in forming a trestle or "horse";

Figure 2 is a perspective view of the coupler member employed in Figure 1;

Figure 3 is an end view of Figure 1;

Figure 4 is a fragmental perspective view of the latching element of the coupler member;

Figure 5 is an end view of a modified coupler member embodying this invention;

Figure 6 is a perspective view of a preferred embodiment of the present invention, showing its use in forming a trestle or "horse";

Figure 7 is a perspective view of the coupler member employed in Figure 6;

Figure 8 is an end view of Figure 6;

Figure 9 is a fragmental perspective view of the latching element of the coupler member; and Figure 10 is an end view of a modified coupler member embodying this form of the invention.

With continued reference to the drawings wherein like reference numerals indicate the same parts throughout the several figures, numeral 10 indicates an assembled trestle or "horse" having coupler members 12 of heavy sheet metal which securely connect pairs of legs 14 and beam 16.

Legs 14 may be of any desired length and have one end thereof tapered as indicated as 18 (Figure 3) while beam 16, also of any desired length, has notches 20 formed in the top surface thereof adjacent its ends.

Coupler members 12 are formed from sheet metal or any other suitable material and are made by cutting the sheet metal to the desired shape and securing these parts together by welding or other suitable means as shown in the form, Figures 1 through 4, or in four pieces as shown in the prefered embodiment of the present invention illustrated by Figures 6 through 10.

The main body portion 22 of each coupler member 12 is formed in a substantially M-shaped configuration with its apices flattened to form parallel surfaces 24, 26 and 28. The inner, downwardly extending sections 30 are parallel to each other and normal to surfaces 24, 26 and 28 spaced apart sufficiently to form with portion 28 a U-shaped stirrup portion adapted to closely but freely receive the end of beam 16. The outer members 32 and 34 extend downwardly and diverge from sections 30.

A plate 38 is welded or otherwise secured to body portion 22 to cover the top half of one open end of member 22 and a plate 40 is welded or otherwise secured to the surfaces 24 and 26 of body 22 to close the open side of rectangular, beam end, receiving pocket 42 formed by sections 28 and 30 of body 22. Plate 40 has a reduced portion 44 which extends outwardly from the side of member 22 opposite that bearing plate 38 and has a latch member 46 secured to the bottom side thereof. Latch 46 has a cam surface 48 facing the free end of portion 44 and a vertical shoulder 50 facing the opposite direction. Latch 46 preferably is secured to extended portion 44 by welding but any other suitable means may be employed.

Plate 40 or at least portion 44 thereof is tempered to impart resilience to portion 44 to allow the numerous flexings of portion 44 incident to the assembly and disassembly of the trestle.

An angle member 52 having leg 54 extending over the portion of the side of member 22 below portion 44 and pocket 42 and its other side 56, of reduced width, extending and parallel to beneath portion 44 and in the plane of surface 28 of member 22. Angle member 52 is secured to body portion 22 of coupling 12 by welding or any other suitable means. The body portion 22 and plate 38 and angle member 52 when secured together as indicated form tapered pockets 58 and 60 which receive tapered ends 18 of legs 14.

This simple, compact coupling member 22 formed by cutting, bending and welding sheet metal members together is inexpensive to manufacture, is durable and efficient in operation and is readily installed without bolts and nuts, screws or the like and with minimum effort by the user. Legs and beams of varying length may be employed to cover varying job conditions and it will be appreciated that a suitable support for use intermediate the ends may be readily provided by providing a coupler as shown in Figure 5, the only difference being that plate 38 is omitted and a plate 65 covering the lower half of body member 22 is provided.

In assembling, the tapered ends of legs 14 are inserted into tapered pockets 58 and 60 and an end of beam 16 is started between portion 44 of plate 40 and leg 56 of angle members 52. As beam 16 is pushed inwardly it is supported by leg 56 and the upper corner of the beam contacts cam surface 48 of latch 46 causing extension 44 to flex upwardly to allow beam 16 to enter pocket 42. As beam 16 reaches its innermost position in pocket 42, portion 44 will spring back into its normal position and latch member 46 will engage in notch 20 of beam 16. The vertical shoulder 50 acting against the mating vertical shoulder of notch 20 will prevent beam 16 from slipping out of coupler 22 until extension 44 is raised sufficiently to disengage these shoulders and plate 38 will prevent beam 16 from passing through pocket 42 in the opposite direction.

It will thus be seen that the coupler of this invention securely fastens the parts together upon assembly without additional parts or operations of the user. It is also an easy matter to dismantle the trestle by inserting a screw driver or similar flat tool under the end of extension 44 or by making extension 44 slightly wider than beam 16 to allow a finger grip thereon and raising it to release latch 46 from notch 20 thereby allowing the withdrawal of the end of beam 16.

In the preferred form of invention, numeral 70 indicates an assembled trestle or "horse" having coupler member 72 of heavy sheet metal or other suitable material which securely connects pairs of legs 74 and beam 76, which are identical to legs 14 and beam 16 of the original form of this invention.

The elements from which coupler members 72 are formed are cut from flat metal plates and consist of numerous pieces secured together as by welding or other similar means.

Rectangular plates 78 form the side members of couplers 72 which are secured together at the bottom ends thereof by strips 80 connected to their lower vertical edges on both sides of plates 78 as by welding or other suitable means. Another plate 82 of substantially greater width than strip 80 is secured to the upper vertical edge of side pieces 78 on one side. Strip 80 and plate 82 are cut in the shape of isosceles trapezoids, with the non-parallel sides of the two members having equal angular relationship to provide the proper spread to legs 74. Plate 82 is preferably made having a width slightly greater than the width of beam 76.

A rectangular pocket 90 is formed from plates 84, 86 and 88, secured together by welding or other suitable means. Pocket 90 has one end thereof secured to the inner surface of plate 82 and is medially located between side plates 78 with plates 88 in a spaced, parallel, vertical position.

Coupler 72 is further strengthened by plates 92 fastened on both sides of pocket 90 to the upper vertical edge of side plates 78 and 88. Plates 84 and 86 are of a greater length than plates 88 and extend outwardly from the body portion of coupler 72. Plate 84 is provided with a spring steel latch member 93 secured to the bottom surface thereof and is spaced from plate 86 sufficiently to allow the insertion of beam 76 therebetween. Plate 84 acts as a locking member by means of latch 93 while plate 86 cooperates to guide the beam into pocket 90 and to support beam 76.

Plates 78, 88, 80, 82 and 92 in their assembled relations combine to form downwardly diverging pockets 94 on opposite sides of rectangular pocket 90. Pockets 94, as seen in Figure 2, are open at their upper and lower ends whereby a leg 74, having a tapered end 75, when inserted through the lower wide end of pocket 94 but not cut at the same angle as downwardly diverging pockets 94, may be forced through the open top of pocket 94 before it is securely positioned therein. The extruding end of leg 75 may then be cut off. It has been found that by forming the leg receiving pockets with the upper ends open, considerable time and material may be saved for, if the tapered end is not cut exactly right, it is only necessary to force the leg into the pocket and does not require recutting or disposal of such leg. Beam 76 is inserted between plates 84 and 86 and pushed inwardly until latch 93 is engaged within notch 77 of beam 76. This assembly is similar to the assembly of the form of Figures 1 to 4 already described.

The coupler may be modified as shown in Figure 10 to provide an intermediate support similar to that shown in Figure 5. In this form of the invention, plate 82 is omitted and plates 96, identical to plates 92, are secured to the upper vertical edge of plates 78 and 88 with a further supporting strip 98 extending between the side plates 78 and abutting the lower edge of pocket 90. This form of intermediate support functions in the same manner as the intermediate support of the original structure and its other parts are identical to the form shown in Figures 6 to 9.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A coupler for use with a slotted trestle beam and leg members, comprising side plates; tie strips connecting said side plates and secured to the vertical edges thereof to position said side plates in the desired angular relation; an end plate connecting the upper vertical edges of said side plates; rectangular plates vertically disposed in spaced parallel relationship to each other, medially located between said side plates and having one edge thereof secured to said end plate; support plates secured to the upper vertical end portion of one side plate and its adjacent rectangular plate and cooperating with said side plates, tie strips, end plate and rectangular plates to form laterally spaced, vertically disposed, downwardly diverging open ended pockets adapted to receive said leg members; and two elongated rectangular plates secured to and between said rectangular plates and to said end plate and forming a horizontal, centrally disposed, rectangular pocket, the lower surface of said upper elongated plate having a latch secured thereto which cooperates with said beam to secure the coupler and beam in locked assembled relationship.

RALPH FALCONE.

REFERENCES CITED

The following references are of record in the file of this patent:

UNITED STATES PATENTS

| Number | Name | Date |
| --- | --- | --- |
| 952,657 | Watrous | Mar. 22, 1910 |
| 1,010,458 | Smith | Dec. 5, 1911 |
| 1,114,336 | Blomqvist | Oct. 20, 1914 |
| 1,343,279 | Reynolds | June 15, 1920 |
| 1,542,048 | Forester | June 16, 1925 |
| 1,601,946 | Dujardin | Oct. 5, 1926 |
| 1,908,858 | O'Kane et al. | May. 16, 1933 |